(12) United States Patent
Pollak

(10) Patent No.: US 6,618,724 B1
(45) Date of Patent: Sep. 9, 2003

(54) HUMAN-NATURAL STRING COMPARE FOR FILESYSTEMS

(75) Inventor: Roman Pollak, Russikon (CH)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/550,561

(22) Filed: Apr. 17, 2000

(51) Int. Cl.⁷ .............................................. G06F 17/30
(52) U.S. Cl. ................. 707/6; 707/2; 707/200
(58) Field of Search ........................... 707/200, 1, 533, 707/7, 6, 5, 536, 104.1, 526, 3, 10; 709/245; 713/1

(56) References Cited

U.S. PATENT DOCUMENTS

| | | | |
|---|---|---|---|
| 5,307,494 A | * | 4/1994 | Yasumatsu et al. ......... 707/200 |
| 5,440,482 A | * | 8/1995 | Davis ........................... 707/6 |
| 5,963,942 A | * | 10/1999 | Igata .............................. 707/6 |
| 6,442,682 B1 | * | 8/2002 | Pothapragada et al. ........ 713/1 |

OTHER PUBLICATIONS

Daniel M. Sunday, A very Fast Substring Search Algorithm, Aug. 1990, 1990 / vol. 33, No., 8 / Communications of the ACM / ACM 0001–0782/90/0800–0312.*

Erick Otto, Two fast pattern–matching algorithms, Feb. 1994, C Users Journal, v12, n2, p38(13).*

* cited by examiner

Primary Examiner—Jean M. Corrielus
Assistant Examiner—Gwen Liang
(74) Attorney, Agent, or Firm—William J. Kubida; Kent A. Lembke; Hogan & Hartson LLP

(57) ABSTRACT

A method for searching a computer directory database is disclosed. The method compares a first and second filename strings, the comparing operating in reverse order, from the end of the strings towards the beginning until either the entirety of the strings has been compared or a mismatch has been found.

6 Claims, 5 Drawing Sheets

HUMAN-NATURAL STRING COMPARE FOR FILESYSTEMS

The invention pertains to the art of computer filesystem directory search, maintenance, and file location. In particular, the invention pertains to methods for comparing filename strings while locating files in computer filesystem directories.

BACKGROUND OF THE INVENTION

Computer filesystems are typically accessed through filesystem directories. Filesystem directories are typically databases, often organized hierarchically, containing a file entry for each file on the system. File entries typically include a filename, a file pointer that directly or indirectly indicates where the file is located on the filesystem, as well as information about the file, often including file status flags, creation, and access history information. Filesystem directories are often frequently accessed.

Files on computer filesystems are usually referred to by filenames. Each time a file on a filesystem is "opened", or accessed for the first time in a given program, it is necessary to search the filesystem directory for file entries having a filename matching the file name of the file to be opened.

Each file entry typically has a file status field and a file pointer field in addition to the filename field.

If a file entry having a matching filename is found, the file status may then be tested for read, execute, and write permissions, as well as any file-lock information. The file pointer may then be followed to locate any existing file contents; which may then be read, overwritten, or deleted. If the file entry has file status indicating that it is a subdirectory, the file pointer may also be followed to that subdirectory, where a further search may be performed for file entries having a filename matching remaining characters of the filename of the file to be opened.

Filesystem directories may be organized in many ways. A common directory organization, used with many Microsoft filesystems among others, has multiple unsorted file entries in a list of file entries for each directory. Each file entry has status indicating whether the entry represents a valid file. Locating a file is then done by comparing the filename being searched for to the filename of successive file entries for valid files, ignoring any entries marked invalid, until all file entries have been examined or a match is found. Directories having this structure often require numerous comparisons for each file "open" operation. It is therefore advantageous to quickly perform each comparison operation when searching filesystem directories.

Another common directory organization, used with many UNIX and similar operating systems, has multiple file entries in a list of file entries for each directory. Each file entry has a filename string, a length of that filename string, and a pointer, in the form of an inode number, to an inode associated with the file. The inode associated with the file has file status information and file location information, the file location information may be direct or indirect through further inodes.

Many filesystem directory search engines have a string comparison routine that compares a filename string with a filename string stored in each file entry. Many of these string comparison routines operate by successively comparing characters, bytes, or words of the strings in order from the first character, byte, or word, of the strings to the last character, byte, or word, of the strings. These engines typically stop comparing the text strings when a mismatch is found. With string comparison routines of this type, a mismatch will be detected in a time that increases with the number of characters, bytes, or words, that must be compared before the mismatch is detected.

It is also known that at least some filesystem directory databases store filenames in file entries in a field of fixed width; it is known that some filesystems link multiple fixed-length fields together to store long filenames. It is known in the art of computer string handling that a string-length byte may be stored ahead of the first character of a string, and that such a string length character is convenient for use in performing string manipulations.

SUMMARY OF THE INVENTION

It has been observed that many files have filenames that are identical or similar in an initial portion of filename, differing in later portions of the filename. A new directory search engine therefore compares a filename with filename fields in each file entry in order from the last character of each string to the first character of each string. The directory search engine stops comparing the strings when a mismatch is found.

On average, the directory search engine of the present invention identifies filename mismatches more quickly than prior art search engines because many filenames are identical or similar in an initial portion of filename. Since many comparisons are performed each time a file is located in a typical filesystem, a considerable savings in processor time may be attained.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1A:
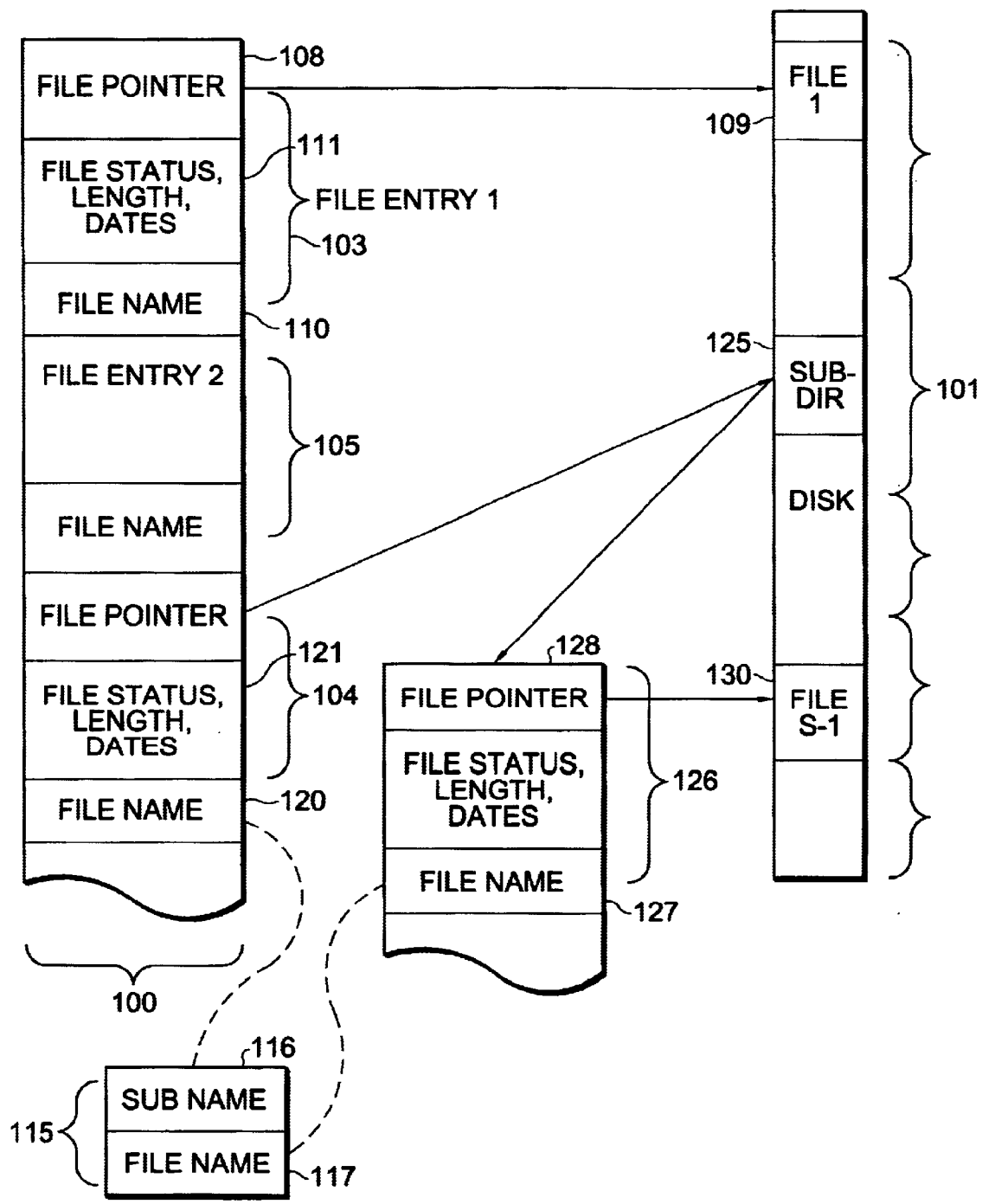
FIG. 1A is an illustration of the structure of a common filesystem directory database, showing the filename fields of file entries.

In a typical disk-memory filesystem directory database, there is a "root" or "top-level" directory 100, normally stored on the filesystem 101 and beginning at a predetermined location. This top-level directory 100 contains multiple file entries, 103, 104, and 105. Each file entry 103 has a file pointer 108 that indicates, directly or indirectly, the location of the file 109 corresponding to that file entry 103 on the filesystem disk 101. It is known that file pointer 108 may indicate the file location indirectly through a File Allocation Table, as in some Microsoft FAT-16 and FAT-32 filesystems. Each file entry 103 also has a filename 110 field containing a name for the file, and associated file status, length, and date fields 111.

When a file 130 must be located by name, a current default "path" may be joined to the name. Alternatively, files may be located by path and name. In both cases, the path and name is parsed into a name list 115 of one or more filename fields, representing the filenames of all the subdirectory files, such as subdirectory name 116, that must be located in order to find the file, and the filename 117 of the file to be found. The filename 117 of the file is the last entry of this name list.

Next, the "root" or "top-level" directory is read by a computer (not shown), and then searched for any occurrence of the first name of the name list 115. On many filesystems, this search is performed by comparing the filename string of the first name of the name list 115 to filename strings stored in the filename fields (110 and 120) of each successive file entry (103, 105, and 104) until a filename field 120 is found that matches the first name of the name list 115. Many string comparison operations may need to be performed before a match is found, because there may be several hundred file entries to search through in a single top level directory or subdirectory of the directory database.

Should the file status field 121 of the file entry 104 having the matching filename field 120 be marked indicating that the associated file is a subdirectory, and the matching filename of the name list 115 not be the last name of the name list, the file pointer 122 of the file entry 104 is followed to the associated subdirectory file 125. This subdirectory file 125 also contains a sequence of file entries, as with file entry 126. The subdirectory file 125 is recursively searched for a file entry 126 having a filename field 127 that matches the next filename string 117 of the name list 115 until all entries of the name list have been considered. The file pointer 128 of the last found file entry 126 may then be followed to the file 130. There may be many subdirectory files in the top level or root directory, and there may be subdirectory files in subdirectory file 125.

Figure 1B:
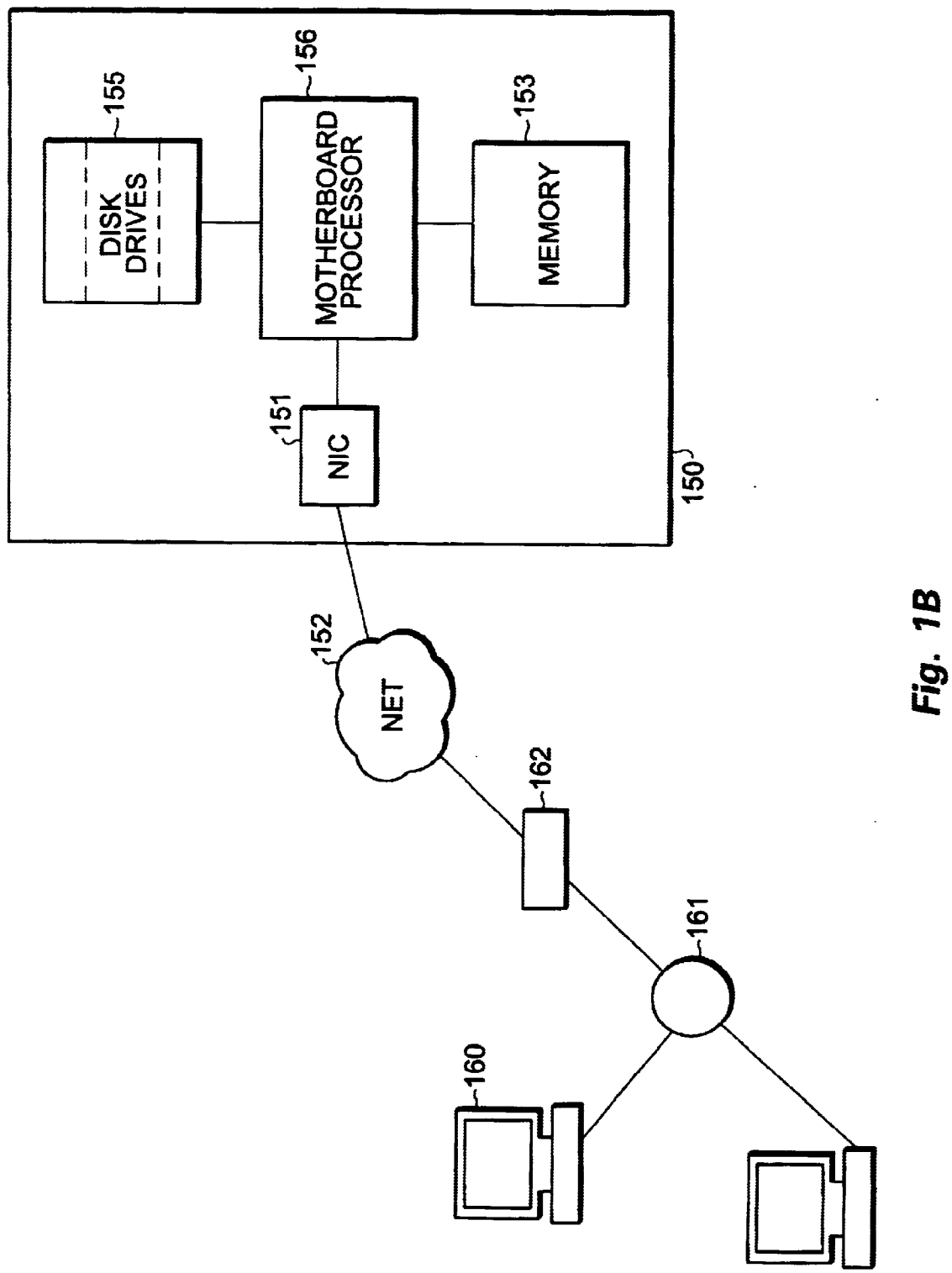
FIG. 1B, an block diagram of a machine having a filesystem directory database, showing how it may be connected to a network.

Such a filesystem is typically implemented on a computer, such as computer 150 (FIG. 1B), which may but need not be connected through a network interface controller 151 of the computer to the Internet 152 or other network. A filesystem directory search engine is loaded into memory 153 of the computer 150, while the filesystem directory database and its files are initially located on one or more disk drives 155. The computer also typically has a motherboard 156 with at least one CPU wherein the filesystem directory search engine executes. Part of the filesystem directory database, and part of the files of the filesystem, may be cached in the memory 153 of the computer 150. The directory search engine is invoked whenever a program, which may be an operating system or user interface program, and which may be responding to a request transmitted to the computer 150 from another computer 160 of the network 152, running on the computer 150 requests access to a file. If the request originated on the other computer 160 of the network, that request may or may not have been transmitted through multiple sets of network hardware 161, bridges, switches, and firewalls 162, as are known in the art of networks.

Another common directory structure, also generally implemented on a computer, is commonly used with UNIX and similar operating systems, including the Solaris (a trademark or registered trademark of SUN Microsystems in the United States and other countries). In this directory structure, a directory file 179 has zero or more file entries such as file entry 180. Each file entry has an inode number 181, a file name string 182, and a length 183 of the file name string. Each entry may also have a length (not shown) of the file entry. The inode number 181 of each file entry points to an inode record 184, which contains file status information 185 and one or more location pointers 188. The location pointers 188 may point directly 190, or indirectly 191 through further inodes 192 having further pointers 194, to the data of a file 195 on the disk 196. As with other filesystems, a disk file may be a subdirectory 198, containing further file entries 199.

Clearly, multiple string-comparison operations are often required when finding a specific file in a directory database of this or similar structure. Therefore it is advantageous if each string-comparison executes quickly.

Typical directory search engines perform each string-comparison operation by first initializing 200 (FIG. 2) a pair of pointers, or array indexes, one of these pointers is initialized to point to the beginning of the appropriate name of the name list 115 (FIG. 1), the other to the beginning of a filename entry in the directory database. String characters from the name list and the directory database are then fetched and compared 201; if a mismatch is found the string compare reports a mismatch 202, whereupon the search engine reinitializes to check the next file entry, if any, at the same level of the directory database. If a match is found the pointers are advanced 203, and a test is performed 205 to determine if all string characters have been tested, e.g., a done test or check. This test may be performed in any of several ways; a counter may be decremented as illustrated if the length of the strings is a constant or is known—as in the case of systems that store strings with a string length byte located in memory immediately before the first character of the string. Alternatively, a NULL character may be placed at the end of each string, completion of the string-compare operation is then found when the next character indicated by the pointers is a NULL.

It has been observed that it is common for filenames to occur in groups, where the first characters of all filenames in the group are the same, but one or more later characters, often characters near the end of each filename string, are different. Humans often do this when naming files because each group of files may be associated with a different program, utility, project, or other classification in their minds. When comparing filename strings during a search for a filename in a group of this type with a string-comparison operation like that of FIG. 2, it is necessary for the string-comparison operation to compare many characters of each filename before a match or mismatch condition can be found. The more characters compared before each match or mismatch is determined, the more computer processor time required by the multiple string comparison operations required to locate a file.

The directory database search engine of the present invention has a string comparison operation that compares the filename strings in reverse order. It has been found that if files are named in groups as described in the preceding paragraph, less computer processor time is required to locate a file with this string comparison operation than with the traditional string comparison operation of FIG. 2.

The string comparison operation of the directory database search engine of the present invention assumes that the filename string lengths are stored with the strings; alternatively the strings may be all of equal length. It begins by comparing 300 (FIG. 3) the lengths of the strings. If the lengths are different, a mismatch has already been found. If the lengths are not different, two pointers are initialized to point to the last character, or word, of each of the strings, the end of the filename list 115 entry 116 being searched for, and the end of the filename field 110 of the file entry 103 being tested for a match.

Figure 2:
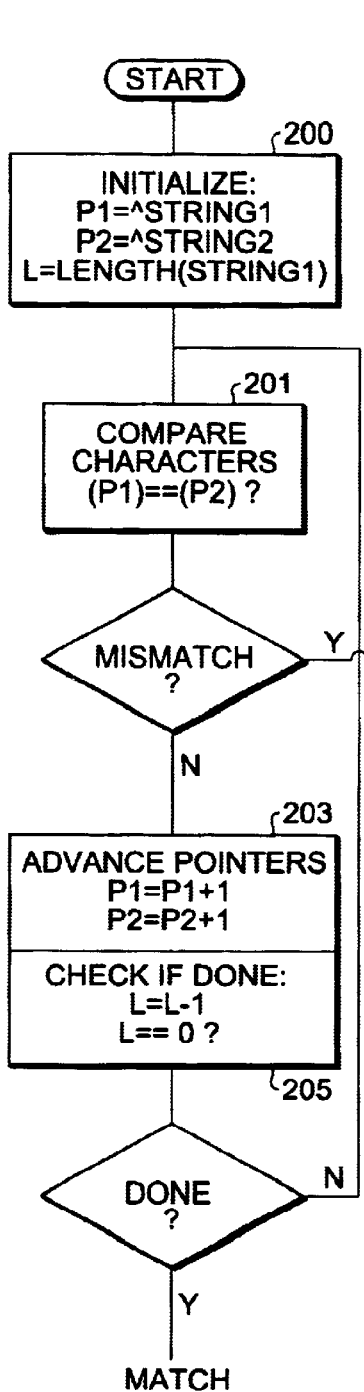
FIG. 2 a flowchart of a prior-art directory-search string-comparison function.
Figure 3:
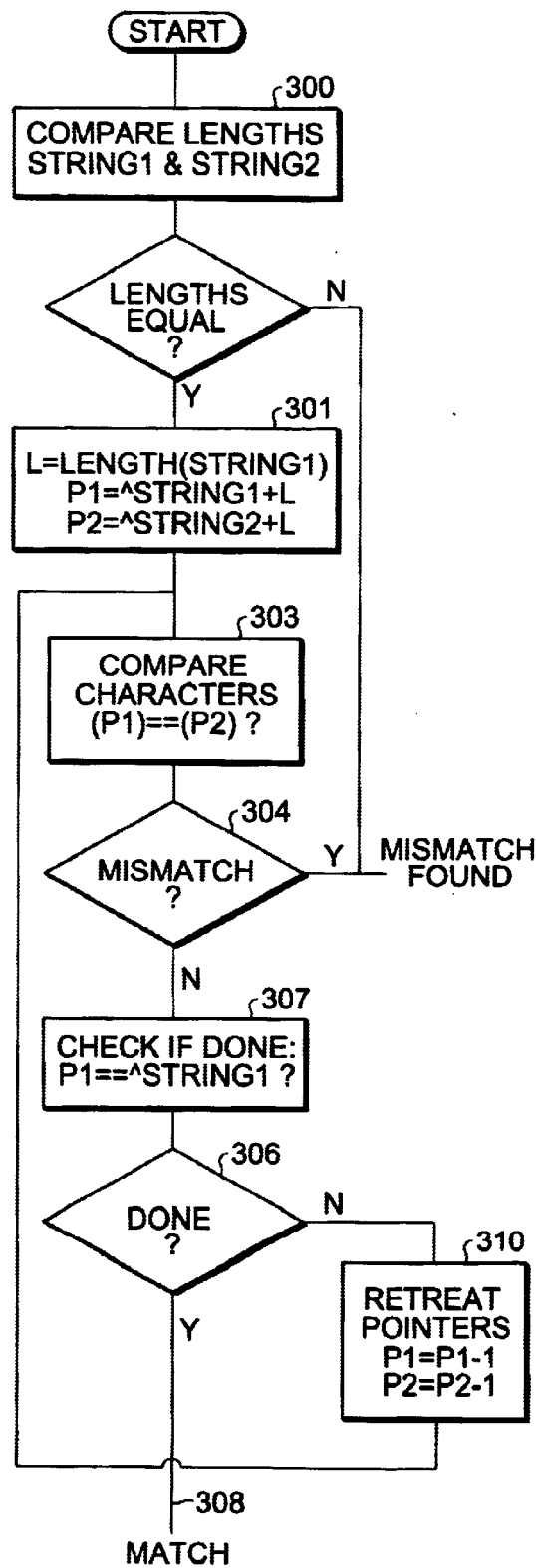
FIG. 3 a flowchart of a directory-search string-comparison function of the present invention.
Figure 4:
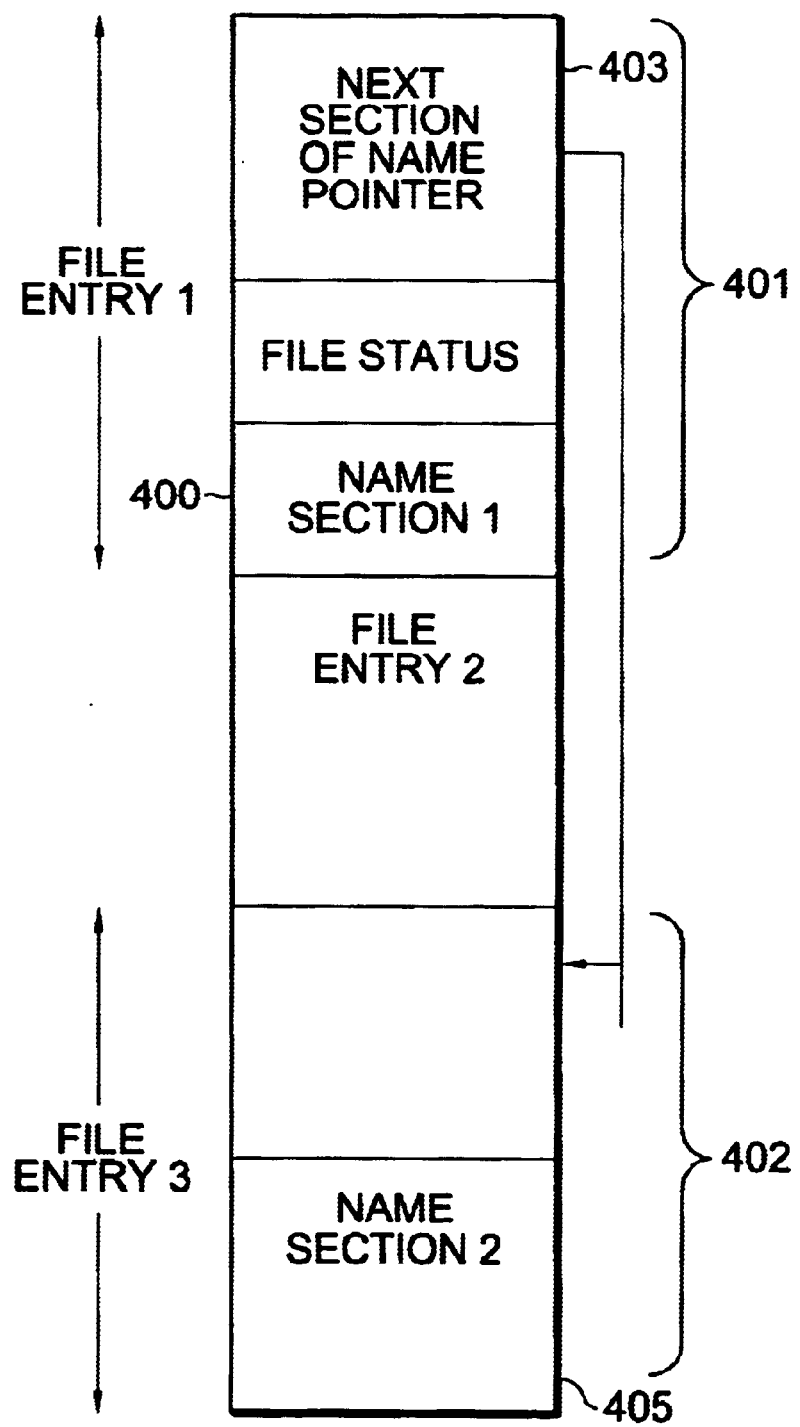
FIG. 4 is an illustration of a structure of another common filesystem directory database for which the reverse-order string comparison of the present invention is particularly useful.

Once the pointers are initialized, the characters pointed to by the pointers are compared 303 (FIG. 3). If a mismatch is detected 304, the string comparison operation ceases and reports that a mismatch has been found—the directory database search engine may then initiate a filename string compare operation of another file entry in the directory being searched. If the characters matched, a test 306 is made to determine if all characters of the strings have been compared. The preferred embodiment performs this test 306 by checking if one of the pointers has been decremented to point 307 to the beginning of the associated string. Alternatively, a loop counter may be used as with the prior-art compare operation of FIG. 2.

When all characters of the strings have been compared, the compare operation ceases and reports 308 that a match has been found. If not all characters have been compared, the pointers are decremented 310 to point to the next earlier character of both strings, and the characters pointed to by the decremented pointers compared 303. The process repeats until either a mismatch is found or all characters of the strings have been compared.

Figure 1C:
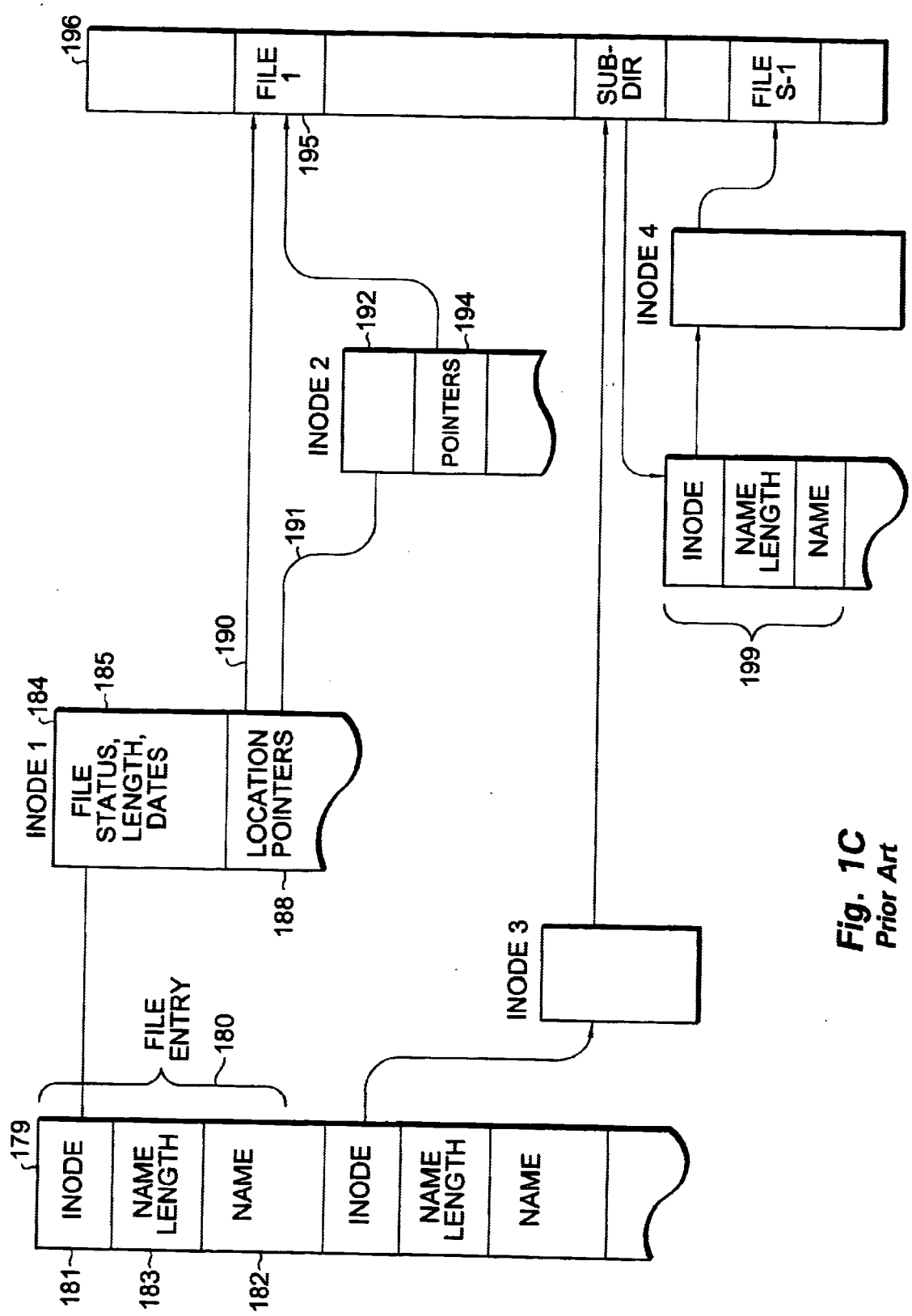
FIG. 1C is an illustration similar to FIG. 1 of another structure of a filesystem commonly used with UNIX and other operating systems.

The file compare operation of the present invention is ideal for use with the directory database structure of FIG. 1C, as used on many UNIX and UNIX-like operating systems, including the UFS filesystem used with the Solaris operating system. When the file compare operation of the present invention is used with the UFS filesystem on a thirty-two bit machine, characters are preferably compared in words of four characters per word, instead of character by character as heretofore discussed, since filenames are guaranteed to be NULL terminated and padded to the end of a word with NULL characters. Comparison may occur in segments of other sizes, such as two or eight characters, on other machines, as appropriate for the computer on which the directory database search engine is run and the structure of the directory database.

While it is possible to compute the length of the filename string lengths on the fly, it is preferred that lengths be stored in the directory files because having to determine these lengths while searching the directories can cost substantial processor time.

In an alternative embodiment of the present invention, intended for use with a particular common filesystem, each filename of the directory database is divided among one or more file entries, where each file entry contains a fixed-length filename field 400. This common filesystem was designed for a degree of compatibility with old software that used fixed-length filenames small enough to fit in the fixed-length filename fields. If a file has a name having more characters than fit within the fixed-length filename field 400 of a single file entry, such as entry 401, multiple file entries are allocated to that file, including following entry 402. A portion of the filename is stored in the fixed-length filename field 403 of the first file entry 401. Each file entry 401 containing the filename contains a link or pointer whereby any further file entries, such as file entry 402, containing further portions of the filename may be found. Each further file entry 402 may have a link to a further file entry or an indication that it is the last file entry containing the file's name. Each further file entry 402 also contains a further fixed-length filename field 405 containing a further section of the filename. At least one such file entry also contains a pointer to the file, as with the previously described embodiment.

With this alternative embodiment, the directory database search engine compares each section 400 and 405 of the filename in reverse order as heretofore described and as illustrated in FIG. 3. The sections 400 and 405 of the filename are, however, compared sequentially from first section 400 to last until a mismatch is found or all sections of the filename are found to match.

While there have been described above the principles of the present invention in conjunction with specific implementation thereof, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

In particular, it is anticipated that reverse-order string comparison of the present invention may be useful in searching many forms of directory structures, including directory structures that have directory database structures different from the specific database structure described herein. It is also anticipated that the reverse-order string comparison of the present invention may be implemented with word or longword compare operations in place of the character compare operations herein described; such an implementation is particularly useful if the strings to be compared are stored in a packed format having multiple characters per word or longword.

An equivalent embodiment of the present invention decrements an index to a string array containing the filename list 115 filename 116 searched for in place of the pointer heretofore described, the array being located at a particular base address. In this embodiment, there is an index into the string array that indicates the character of the filename being compared at any particular iteration of the comparison loop. This embodiment is equivalent because an effective address, or pointer, is constructed by adding the base address to the index, followed by a read-and-compare-character operation from that effective address, at each iteration of the loop.

A computer program product is any machine-readable media, such as an EPROM, ROM, RAM, DRAM, disk memory, or tape, having recorded on it computer readable code that, when read by and executed on a computer, instructs that computer to perform a particular function or sequence of functions.

What is claimed is:

1. A method for searching a file directory, comprising:

receiving a filename string to search for in the file directory, wherein the file directory includes a plurality of filename strings;

identifying a filename string in the file directory for comparing to the searched for filename string;

comparing a string length of the searched for filename string to a string length of the identified filename string;

when the string lengths differ based on the comparing, reporting a filename mismatch and then repeating the identifying;

when the string lengths are equal based on the comparing, setting a first pointer to reference a last character of the identified filename string;

setting a second pointer to reference a last character of the searched for filename string;

detecting a filename mismatch if the character of the identified filename string referenced by the first pointer does not match the character of the searched for filename string referenced by the second pointer;

checking if any more characters of the filename strings remain to be compared and reporting a filename match if no more characters remain to be compared;

resetting the first pointer to reference an earlier character of the identified filename string;

resetting the second pointer to reference an earlier character of the searched for filename string; and repeating the steps of detecting, checking, and resetting until a filename mismatch is detected or a filename match is reported.

2. The method of claim 1, wherein the string length of the identified filename string is stored in the file directory with the identified filename string and the comparing includes retrieving the stored string length.

3. A computer program product, tangibly embodied on a computer readable medium comprising:

computer readable code for receiving a filename string to search for in a file directory, wherein the file directory includes a plurality of filename strings;

computer readable code for identifying a filename string in the file directory for comparing to the searched for filename string;

computer readable code for comparing a string length of the searched for filename string to a string length of the identified filename string;

computer readable code for when the string lengths differ based on the comparing, reporting a filename mismatch and then repeating the identifying;

computer readable code for when the string lengths are equal based on the comparing, setting a first pointer to reference a last character of the identified filename string;

computer readable code for setting a second pointer to reference a last character of the searched for filename string;

computer readable code for detecting a filename mismatch if the character of the identified filename string referenced by the first pointer does not match the character of the searched for filename string referenced by the second pointer;

computer readable code for checking if any more characters of the filename strings remain to be compared and reporting a filename match if no more characters remain to be compared;

computer readable code for resetting the first pointer to reference an earlier character of the identified filename string;

computer readable code for resetting the second pointer to reference an earlier character of the searched for filename string; and computer readable code for repeating the steps of detecting, checking, and resetting until a filename mismatch is detected or a filename match is reported.

4. The computer program product of claim 3, wherein the string length of the identified filename string is stored in the file directory with the identified filename string and the comparing includes retrieving the stored string length.

5. A computer system tangibly embodied on a computer readable medium for searching a file directory, comprising:

means for receiving a filename string to search for in the file directory, wherein the file directory includes a plurality of filename strings;

means for identifying a filename string in the file directory for comparing to the searched for filename string;

means for comparing a string length of the searched for filename string to a string length of the identified filename string;

means for when the string lengths differ based on the comparing, reporting a filename mismatch and then repeating the identifying;

means for when the string lengths are equal based on the comparing, setting a first pointer to reference a last character of the identified filename string;

means for setting a second pointer to reference a last character of the searched for filename string;

means for detecting a filename mismatch if the character of the identified filename string referenced by the first pointer does not match the character of the searched for filename string referenced by the second pointer;

means for checking if any more characters of the filename strings remain to be compared and reporting a filename match if no more characters remain to be compared;

means for resetting the first pointer to reference an earlier character of the identified filename string;

means for resetting the second pointer to reference an earlier character of the searched for filename string; and means for repeating the steps of detecting, checking, and resetting until a filename mismatch is detected or a filename match is reported.

6. The system of claim 5, wherein the string length of the identified filename string is stored in the file directory with the identified filename string and the comparing means includes means for retrieving the stored string length.

* * * * *